United States Patent [19]

Meyer et al.

[11] Patent Number: 4,799,745
[45] Date of Patent: Jan. 24, 1989

[54] HEAT REFLECTING COMPOSITE FILMS AND GLAZING PRODUCTS CONTAINING THE SAME

[75] Inventors: Stephen F. Meyer, Los Altos; Thomas G. Hood, San Francisco, both of Calif.

[73] Assignee: Southwall Technologies, Inc., Palo Alto, Calif.

[21] Appl. No.: 880,797

[22] Filed: Jun. 30, 1986

[51] Int. Cl.$^4$ ............................ G02B 5/28; C23C 4/00
[52] U.S. Cl. .................................. 350/1.7; 204/192.27
[58] Field of Search ...................... 350/1.7; 204/192.27

[56] References Cited

U.S. PATENT DOCUMENTS

| | | | |
|---|---|---|---|
| 3,272,986 | 9/1966 | Schmidt | 350/1.7 |
| 3,682,528 | 8/1972 | Apfel et al. | 350/1 |
| 3,846,152 | 11/1974 | Franz | 350/1.7 |
| 3,900,673 | 8/1975 | Mattimoe et al. | 428/339 |
| 4,204,942 | 5/1980 | Chahroudi | 204/298 |
| 4,335,166 | 6/1982 | Lizardo et al. | 428/34 |
| 4,337,990 | 7/1982 | Fan et al. | 350/1.7 |
| 4,639,069 | 1/1987 | Yatabe et al. | 350/1.7 |

FOREIGN PATENT DOCUMENTS 0080182  6/1983  European Pat. Off. .

OTHER PUBLICATIONS

Knittl, Zdenek, "Optics of Thin Films", John Wiley & Sons, Ltd., London, 1976, p. 284.

*Primary Examiner*—Bruce Y. Arnold
*Attorney, Agent, or Firm*—Ciotti & Murashige, Irell & Manella

[57] ABSTRACT

Visually transparent, infra-red reflecting films are disclosed for solar heat control. The films employ Fabry-Perot sandwich interference filters which are characterized by having two or more transparent layers of sputter-deposited metal such as silver directly contiguous with dielectric spacer layers and optionally boundary layers. Methods for producing these materials by sputtering techniques as well as glazing materials incorporating these films are disclosed, as well.

25 Claims, 4 Drawing Sheets

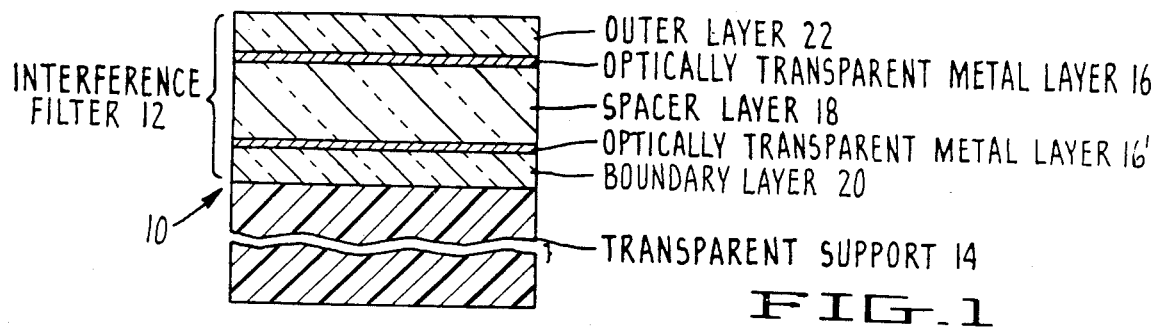
FIG_1
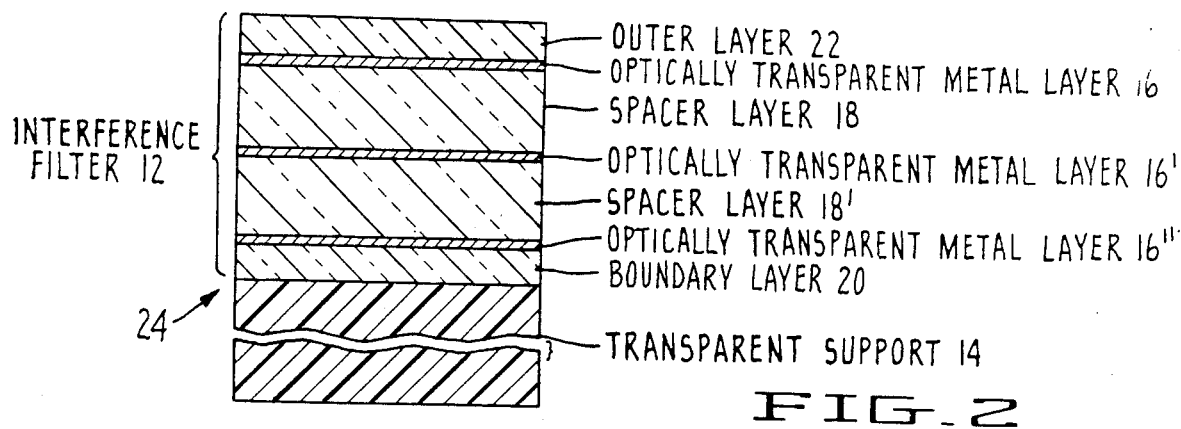
FIG_2
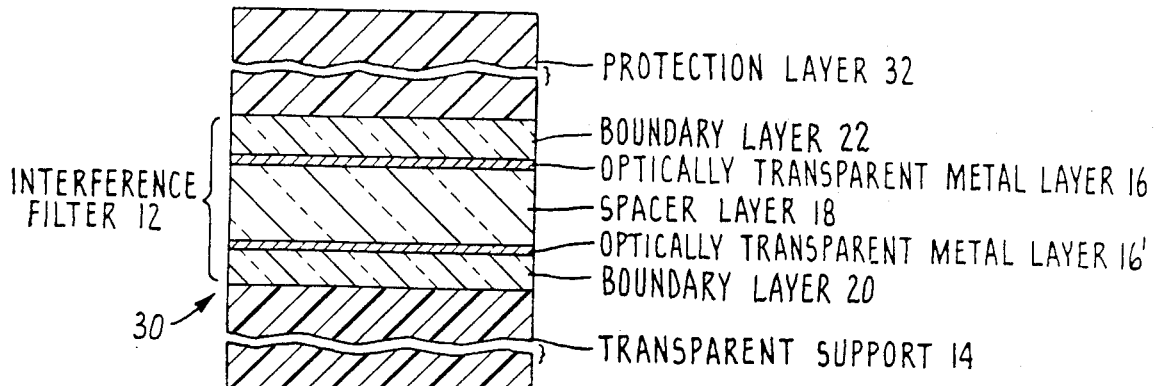
FIG_3
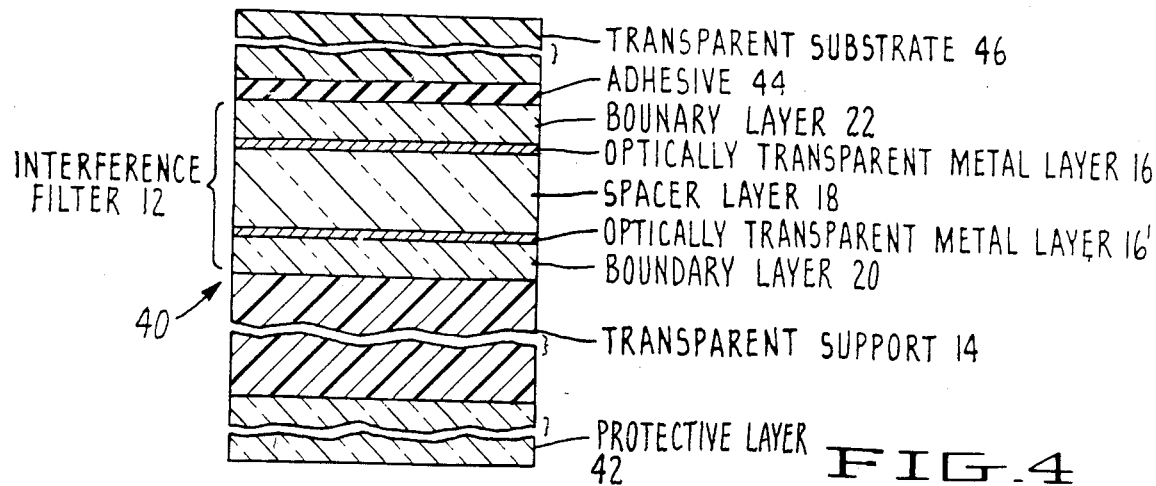
FIG_4

HEAT REFLECTING COMPOSITE FILMS AND GLAZING PRODUCTS CONTAINING THE SAME

BACKGROUND OF THE INVENTION

1. Field of the Invention

This invention relates to heat reflecting films. More particularly, it relates to composite films comprising a series of dielectric and metal layers so as to create an infra-red reflecting interference filter and to the use of such films in window glazing materials.

2. Description of the Prior Art

In the 1890's, Fabry and Perot developed an interferometer consisting of a pair of parallel-sided half-silvered mirrors separated by a nonabsorbing layer. This device had the property of preferentially passing energy of certain wavelengths and reflecting energy of other wavelengths. An embodiment of this principle known as the Fabry-Perot sandwich consists of two more or less transparent metal layers separated by a dielectric spacer layer. (See, for example, Knittl, Zdenek; OPTICS OF THIN FILMS, John Wiley & Sons, Ltd., London, 1976, at page 284.) Other filter products known as "induced transmission filters" have been constructed of metal-dieletric sandwiches for use in window glazing structures. One such structure is described in U.S. Pat. No. 4,337,990 of Fan (July 6, 1982) as consisting of a transparent substrate, overlayered with a phase matching layer, a single metallic silver layer and an outer antireflection layer, with the three overlayers constituting a transparent heat reflector. While generally effective, products of this general structure suffer from the disadvantage that to achieve high levels of heat reflection they must have relatively thick metal layers such as 15 to 25 nm in thickness which tend to have low transmittances of visible radiation, as well.

Another system which used a Fabry-Perot approach to achieve heat reflection while transmitting visible radiation is shown in U.S. Pat. No. 3,682,528 of Apfel and Gelber Aug. 8, 1972). In this system, thinner layers of metal are employed but it is taught that to obtain such layers of an optically suitable metal, in particular silver, it is necessary to first lay down a thin "nucleation" precoat layer of nickel by vacuum deposition and then apply the silver to it, again by vacuum deposition methods. It is further taught that the deposited silver must then receive a thin postcoat layer of vapor-deposited nickel if another layer is to be applied over it. These extra coatings with nickel are time consuming and economically unattractive. This patent also discloses a filter having two silver layers but shows that each silver layer must be accompanied by one or two nickel layers and suggests only durability advantages to this more involved structure. The substrate upon which this multilayer heat reflecting film was constructed most commonly was glass which, being rigid and heavy in weight, added to the difficulties of fabrication.

SUMMARY OF THE INVENTION

It is a general object of this invention to provide an improved transparent film which will selectively reflect heat, that is infra-red radiation.

It is a further object to provide a transparent film which has superior visual transparency with enhanced infra-red reflection.

It is yet a further object to provide a Fabry-Perot transparent film filter which has multiple metal layers but which minimizes the complexity and production difficulties attendant therewith.

It is also an object in certain embodiments of this invention to provide a heat reflecting transparent film which is plastic backed and has enhanced durability and scratch resistance.

It is an additional object to provide glazing structures incorporating these heat reflecting transparent films.

It has now been found that these and and other related objects are achieved by employing in such films a Fabry-Perot filter incorporating a plurality of layers of sputter-deposited transparent metal separated from one another by directly contiguous spacer layers of dielectric. In preferred embodiments, the spacer layers are sputter-deposited inorganic oxides.

Thus in one aspect this invention involves improved transparent, infrared reflecting composite films including a transparent metal layer-dielectric layer Fabry-Perot interference filter adhered to a transparent support, wherein the improvement involves employing as the interference filter a multilayer stack including at least two separate discrete continuous sputter-deposited transparent metal layers separated from one another by discrete continuous layers of dielectric.

In another aspect this invention involves visually transparent, infrared reflecting composite films comprising a transparent support having adhered to one surface thereof two or more sequential interference filters each of the filters comprising a continuous discrete sputter-deposited transparent metal layer directly sandwiched between continuous spacer layers of dielectric.

In further aspects this invention involves methods of producing such films by sputter-deposit techniques.

This invention can be embodied in many forms. It can take the form of plastic-supported sheets which may be interposed within or applied to transparent window glazing materials. It may take the form of a thin metal-dielectric multilayer sandwich film laid down directly onto a glazing material substrate. In such applications the film may contain additional layers such as hardcoats.

DETAILED DESCRIPTION OF THE INVENTION

Brief Description of the Drawings

In the drawings,

FIG. 1 is a schematic cross-sectional view of a simple heat reflecting film of this invention employing two layers of sputter-deposited metal:

FIG. 2 is a schematic cross-sectional view of a simple three metal layer heat reflector film of this invention;

FIG. 3 is a schematic cross-sectional view of a two metal layer heat reflector film of this invention having a physical protection layer covering its Fabry-Perot filter;

FIG. 4 is a schematic cross-sectional view of a two metal layer heat reflector film of this invention having an optical protection layer on its transparent support

DESCRIPTION OF PREFERRED EMBODIMENTS

Definitions

Figure 1A:
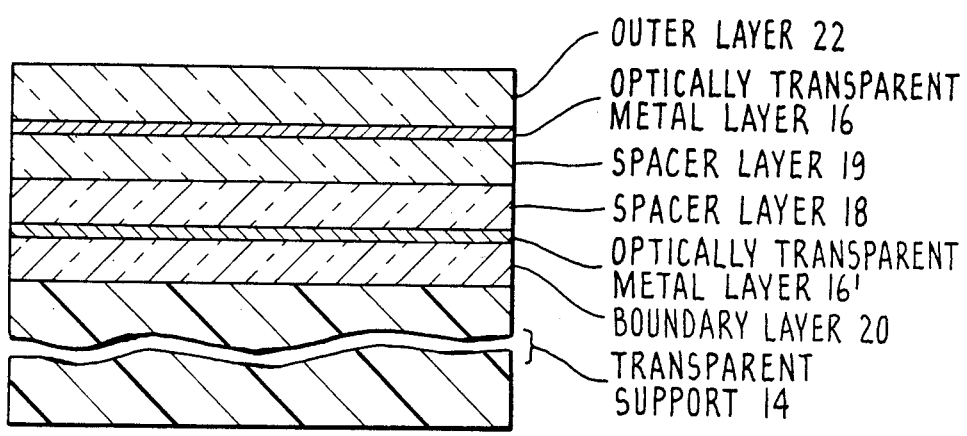
FIG. 1A is a schematic cross-sectional view of a heat reflecting film of this invention having two metal layers separated by a double spacer layer.

As used in this specification and the appended claims, the following terms have defined meanings:

"Visible radiation" or "light" means electromagnetic radiation having a wavelength of from 380 nanometers to 750 nanometers. (CIE Standard)

"Infrared radiation" or "heat" means electromagnetic radiation having a wavelength above 750nanometers.

"Transparent" means having the property of transmitting visible radiation unless otherwise stated.

"Tvis" or "Tv" or "Transmittance visible" each refer to a measure of transmittance over the visible wavelength. It is an integrated term covering the area under the transmittance vs. wavelength curve throughout the visible wavelengths. (1931 CIE Illuminant C Standard)

"Tsol" or "Ts" or "Transmittance solar" each refer to a measure of transmittance over all solar energy wavelengths. (ASTM E 424A) It is an integrated term covering the area under the transmittance vs. wavelength curve for both visible and infrared wavelengths. In heat reflecting films and glazings incorporating them it is a primary goal to decrease Tsol while maintaining Tvis as high as possible.

"SC" or "Shading Coefficient" is an accepted term in the field of architecture. It relates the heat gain obtained when an environment is exposed to solar radiation through a given area of opening or glazing to the heat gain obtained through the same area of ⅛ inch single pane clear glass. (ASHRAE Standard Calculation Method) The clear glass is assigned a value of 1.00. An SC value below 1.00 indicates better heat rejection than single pane clear glass. A value above 1.00 would be worse than the baseline clear single pane.

"Transparent metal layers" are homogeneous coherent metallic layers composed of silver, gold, platinum, palladium, aluminum, copper and nickel and alloys thereof of a thickness which permits substantial tranparency.

"Sputter deposit" or "sputter-deposited" refers to the process of the product of the process in which a layer of material is laid down by the use of a magnetron sputterer.

"Dielectrics" are nonmetallic materials which are transparent to both visible and infrared radiation. Generally, these materials are inorganic oxides but other materials such as organic polymers may be included as well.

"Contiguous" has its usual meaning of being in actual contact, i.e. of being adjoining. From time to time the somewhat redundant term "directly contiguous" is used for emphasis or clarification and has an identical meaning.

A "spacer layer" is a dielectric layer located between and contiguous with two transparent metal layers. In FIG. 1, 18 is a spacer layer.

A "boundary layer" is a layer contiguous with one and not two transparent metal layers. In FIG. 1, 20 and 22 are boundary layers.

Description of Filters

The present invention involves heat reflecting filters. A basic embodiment of these filters is shown as film 10 in FIG. 1. Film 10 includes a multilayer interference filter 12 directly adhered to a transparent support 14. Filter 12 operates according to the Fabry–Perot principle and includes two transparent metal layers 16 and 16' separated by a spacer layer 18 and bonded by two outer or boundary layers 20 and 22.

In FIG. 1A, another embodiment of a film carrying a multilayer filter is shown. In this embodiment the spacer layer between the two metal layers 16 and 16' is itself made up of two continuous layers of dielectric 18 and 19 such that each of the metal layers is directly sandwiched between independent layers of dielectric. As can be seen by comparing FIGS. 1 and 1A, the center spacer layer is made up of dielectric and can be either a single layer (FIG. 1) or two contiguous layers (FIG. 1A).

Several features of this filter should be emphasized. The first is that the transparent metal layers are sputter-deposited. The second is that the spacer and boundary layers are directly contiguous with the transparent metal layers. No nucleation layers are required or employed with the sputtered transparent metal layers which the present invention incorporates.

As will be seen with reference to FIG. 2, more than two transparent metal layers, each separated from one another by a spacer layer can be employed. In theory, there is no limit to the number of transparent metal layers that can be used in these sandwich filters. In practice, however two to five transparent metal layers are preferred with two or three transparent metal layers being more preferred.

The thickness of the various layers in the filter should be controlled to achieve an optimum balance between desired infra-red reflectance and desired visible radiation transmittance. The ideal thicknesses can also depend upon the nature of the transparent metal and dielectric employed.

Each of the transparent metal layers 16 and 16' is from about 4 to about 40 nanometers (nm) in thickness, with the total thickness of metal generally being from about 12 to about 80 nm. With silver and silver alloyed with up to about 25% w of gold, which constitute preferred transparent metals, excellent results are obtained with two or three layers of metal, each from 4 to 17 nm in thickness especially from about 5 to about 13 nm.

In FIG. 1. the two transparent metal layers are depicted as of equal thickness. This is not a requirement of the present invention but is generally preferred for ease of fabrication. Because the transparent metals are sputter-deposited, the thickness of the deposits is a function of the sputtering conditions. If, as is usually most convenient and thus preferred, the conditions are held constant, the thicknesses of the layers will be constant.

The spacer layer 18 between the two transparent metal layers 16 and 16' is between about 40 and about 200 nm in thickness. The preferred thicknesses selected within this range will depend upon the index of refraction of the dielectric employed. Spacer layers are preferably from about 50 to about 110 nm and especially from about 70 to about 100 nm in thickness for dielectrics having an index of refraction of from about 1.75 to about 2.25. Materials having an index of refraction within this range include the inorganic dielectrics such as metallic and semimetallic oxides, for example indium oxide, tin oxide, titanium dioxide, silicon oxide, silicon dioxide, bismuth oxide, chromium oxide, as well as other inorganic metal compounds and salts, for example zinc sulfide and magnesium fluoride and mixtures thereof. Of these materials, preference is given to indium oxide, tin oxide and mixtures thereof and titanium dioxide.

With materials having indices of refraction in the 1.4 to 1.75 range, spacer thicknesses are somewhat thicker. Suitable thicknesses in this embodiment are from about 75 to about 200 nm with thicknesses from about 100 to about 175 nm being preferred. Materials having these indices of refraction include hydrocarbon and oxyhydrocarbon organic polymers (1.55–1.65 index of refraction) and fluorocarbon polymers (1.35–1.45 index of refraction).

As will be described below, the inorganic metallic and semimetallic oxide dielectrics can be conveniently and preferably deposited by reactive sputtering techniques, although, if desired, chemical deposit and vapor deposition methods can be employed to apply the dielectric layers.

Filter 12 in FIG. 1 is depicted with two boundary layers 20 and 22. These layers provide physical protection to the metal layers beneath them and also serve to reduce visual reflections off of the metal surface to which they are contiguous. It is preferred to have a symmetric sandwich with boundary layers on both outside surfaces. This will give rise to a series of two or more sequential Fabry-Perot interference filters each of the filters comprising a continuous discrete sputter-deposited solar transparent metal layer directly sandwiched between continuous layers of dielectric. This is shown in FIG. 1A.

Figure 1B:
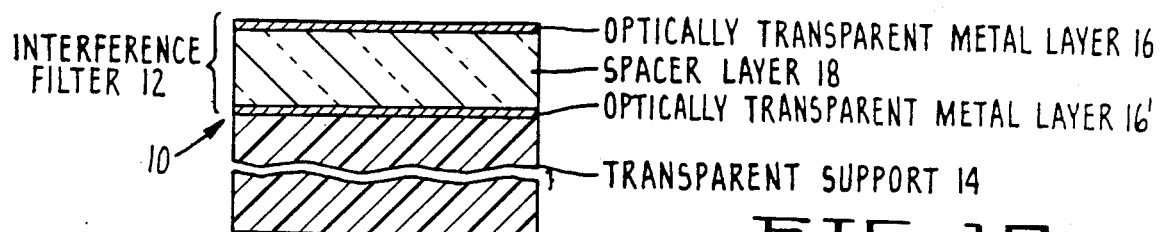
FIG. 1B is a schematic cross-sectional view of a very simple heat reflecting film of this invention having two metal layers separated by a double spacer layer andnot including one or more outer or boundary layers.

However, if desired, one or both of the boundary layers can be omitted. This is shown in FIG. 1B. The boundary layers can be the same or different dielectric and can be identical to or different than the dielectric making up the spacers. The same preferences for materials recited for the spacer apply to the boundary layers and, for simplicity, it is preferred if the boundary layers and the spacer layers are all made of the same materials and if they are all sputter-deposited.

The thicknesses of the boundary layers range from about 20 nm to about 150 nm. Boundary layers are preferably from about 25 to about 90 nm and especially from about 30 to about 70 nm in thickness for dielectrics having an index of refraction of from about 1.75 to about 2.25. With materials having indices of refraction in the 1.4 to 1.75 range, preferred thicknesses are from about 30 to about 140 nm and especially from about 45 to about 100 nm. If, as shown in FIG. 2, three or more transparent metal layers are employed, the boundary layers will remain substantially unchanged.

Supporting the Filter

In each of FIGS. 1 through 6, the Fabry-Perot type filter is shown directly adhered to a transparent support 14. This support is shown in section because it is many times as thick as the filter. This thick support is essential to the practice of this invention. The filter itself is at most only a few hundred nanometers thick and thus can have only minimal physical strength without the added support. Support 14 can be selected from among the rigid and nonrigid but minimally stretchable transparent solids which can withstand the conditions of sputter deposition. Glass, both plate glass and laminated glass, and rigid plastics, such as poly(carbonate) and poly(acrylate) in thicknesses from about 50 mils to about 5 cm or more are representative examples of rigid supports. Poly(ester)s including poly(ethylene terphthalate) and other terphthalate ester polymers, poly(urethanes), cellulose ester polymers, acrylic polymers, and poly(vinyl fluoride)s from about 1 or 2 mils to about 50 mils in thickness are representative examples of nonrigid, minimally stretchable films which may be employed. Poly(esters) and in particular poly(ethylene terphthalates) such as the duPont "Mylars" are a preferred group of film supports.

The filter 12 is directly adhered to the support 14. This can be carried out by sequentially applying the various layers of the filter directly to the support. If the layers are applied by sputter deposition, this can involve first sputter depositing a boundary layer, then a transparent metal layer, a spacer layer, etc.

Incorporation into Glazing Structures

As may be seen by referring to FIGS. 3 through 6, the multi-metal layer films of this invention may, if desired, contain a number of optional layers and may be incorporated into a great variety of glazing structures for architectural and transportation system uses. In FIG. 3 a film 30 is shown containing an optional protection layer 32 over filter 12. This layer 32 can typically be a hardcoat, such as a silicon-containing coating which is applied as a liquid and thereafter cured with heat and/or plasma or corona discharge to yield a hard scratch-resistant overcoating. Typical hardcoats are the cured products resulting from heat or plasma treatment of (a) a hydrolysis and condensation product of methyltriethoxysilane; (b) mixtures of poly(silicic acid) and copolymers of fluorinated monomers with compounds containing primary and secondary alcohol groups as described in U.S. Pat. Nos. 3,429,845 and 3,429,845, respectively. Other hardcoat layers are described in U.S. Pat. Nos. 3,390,203; 3,514,425; and 3,546,318. These hardcoat layers have thicknesses in the range of a few to a few hundred microns.

In FIG. 4, a preferred configuration 40 for employing the films of this invention is depicted. In this embodiment, the filter 12 is deposited on a support 14 as already described. The opposite side of the support 14 carries a previously applied hardcoat 42 for scratch resistance. The filter side of the film is then adhered to a transparent substrate 46 such as another film or a layer or glass or rigid plastic, or the like using an optically acceptable adhesive 44 such as poly(vinyl butyral), ionomer resin, poly(urethane) resin, or polyvinyl chloride resin. Although not wishing to be limited to a particular adhesive, preference is given to the commonly used glass adhesive, poly(vinyl butyral).

The configuration shown in FIG. 4, is of special interest in areas where the polymer film supported filter is applied to the inside surface of a sheet of glass or other rigid material. This can be used as architectural glass, as automotive windshields (when the glass is a suitable tempered or laminated safety glass), automotive side or rear window glass (again with proper tempering, etc), as aircraft canopies, and the like. In these applications, the plastic support 14 can, if desired, be selected to provide antilacerative properties to the resulting final product, as is disclosed in U.S. Pat. No. 3,900,673 which is incorporated herein by reference both for its teachings of antilacerative coatings and for its teachings of the fabrication of safety glass structures.

Figure 5:
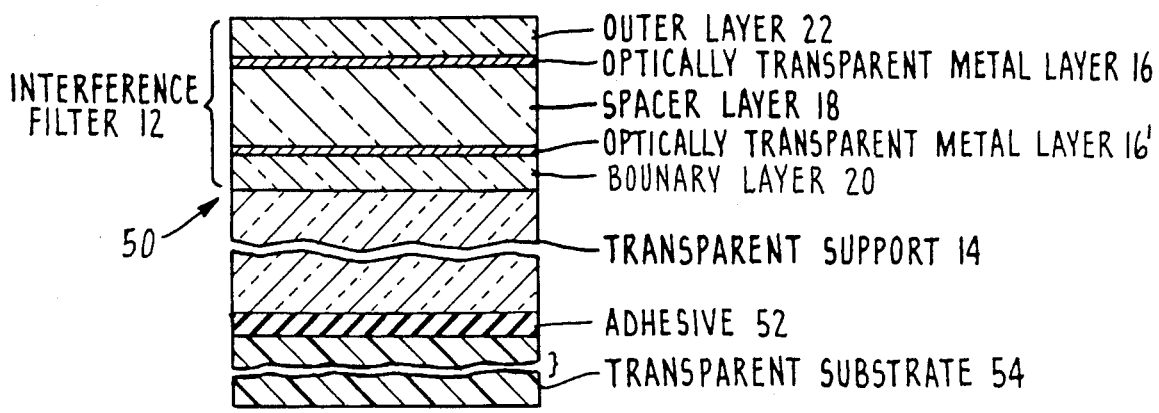
FIG. 5 is a schematic cross-sectional view of a film such as shown in FIG. 1 adhered to an additional transparent substrate via its support layer. This too could serve as window glazing.

Turning to FIG. 5, another embodiment 50 of the invention is depicted in which the film is adhered to a transparent glass substrate 54 with an adhesive 52, this time through the transparent plastic support 14. This embodiment has the disadvantage that the filter 12 is potentially physically accessible so that it can be physically damaged if great care is not taken. This can of course be corrected by placing this surface in the interior of a double pane glass unit, or by providing other suitable protection.

Figure 6:
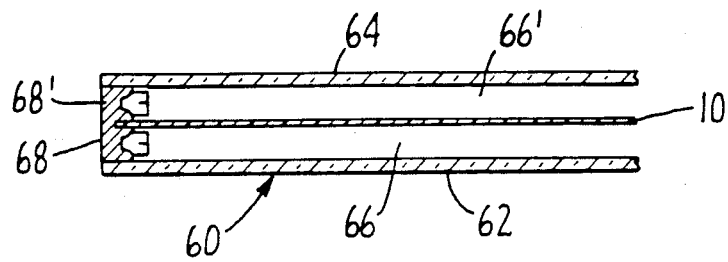
FIG. 6 is a cross-sectional view of a double pane window glazing incorporating a film of the invention.

In FIG. 6 yet another embodiment 60 is shown. Window unit 60 contains a sheet of film 10 stretched under tension between glass or plastic panes 62 and 64, 66 and 66' are air voids and 68 and 68' are spacer plugs for holding the film in proper position and properly under tension. This general window structure in which the present filters may be used and the materials and methods of its manufacture are shown in U.S. Pat. No. 4,335,166, which is incorporated herein by reference.

An unexpected advantage of the films of the present invention which employ multiple transparent metal layers is their superior efficiency when laminated to a transparent substrate in the configuration shown in FIG. 4.

Figure 7:
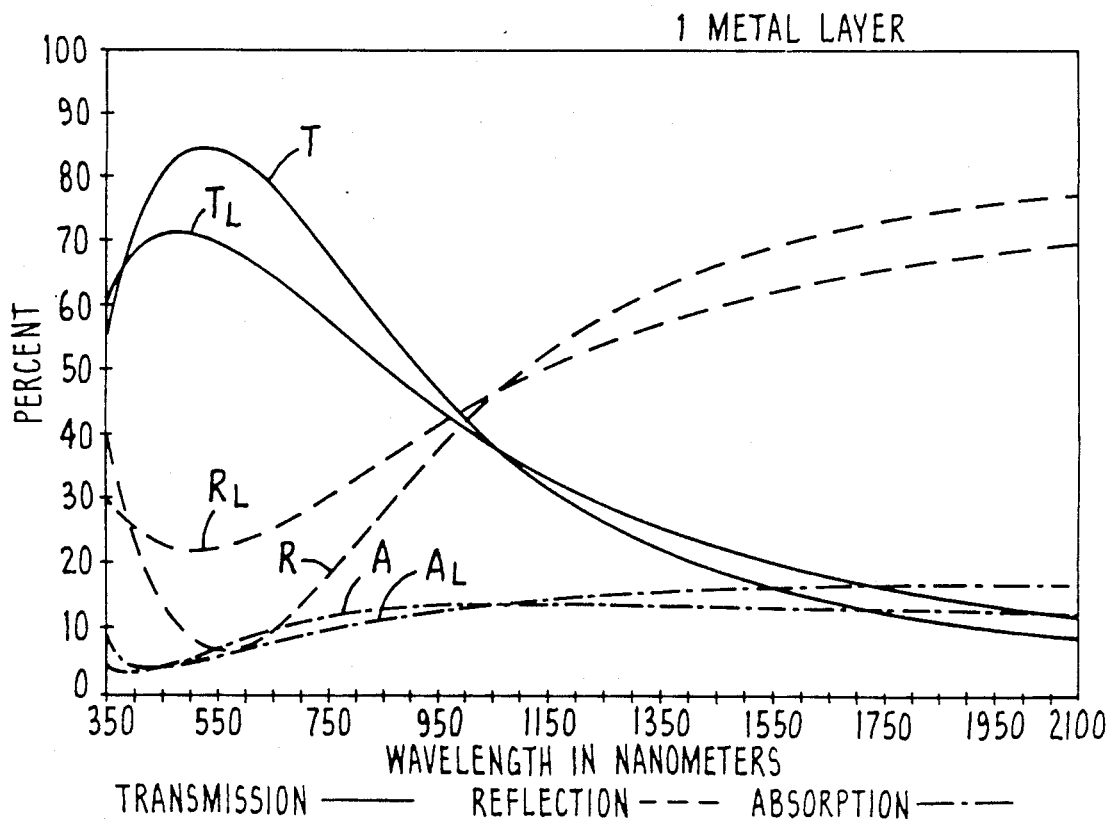
FIG. 7 is a graph illustrating for comparison purposes the performance of a prior art reflecting film.

In this configuration, the multiple transparent metal layer filters of this invention offer special advantages and efficiencies. When a transparent support-backed single metal layer sandwich filter (i.e. an induced transmission filter) is laminated directly to a second sheet of transparent substrate to give a support-filter-substrate configuration, the filter undergoes a drop in efficiency. FIG. 7 illustrates that for a single metal layer filter this drop in efficiency is quite pronounced.

FIG. 7 depicts the transmission and reflectance of visible and infra-red wavelengths by a one metal layer filter with and without lamination to a second transparent layer. In the case shown, this second layer is a second layer of plastic support. By difference, the energy absorbed by this filter with and without lamination is shown as well. Line T is the transmittance curve for the unlaminated film. $T_L$ is the transmittance curve for the laminated film. R and $R_L$ are the reflectance curves. A and $A_L$ are the absorption curves. This filter has a 4 mil poly(ethylene terphthalate) (PET) backing having a directly deposited 46 nm thick tin-indium mixed oxide dielectric boundary layer; an 11.8 nm thick layer of sputter-deposited silver topped with another 46 nm thick tin-indium oxide boundary layer. The layer to which this film is laminated is a second sheet of the PET.

As can be seen, the lamination causes transmittance in the visible region to drop markedly while substantially increasing transmittance of energy in the infra-red region. The Tvis value for the filter drops from 82% to 70% when it is laminated. As the same time Tsol only drops from 62% to 55%. This illustrates that the filter is not preferentially passing visible wavelengths with the efficiency it did before lamination. This film when laminated provides a Shading Coefficient of 0.67. This is little better than conventional green-tinted glass.

Figure 8:
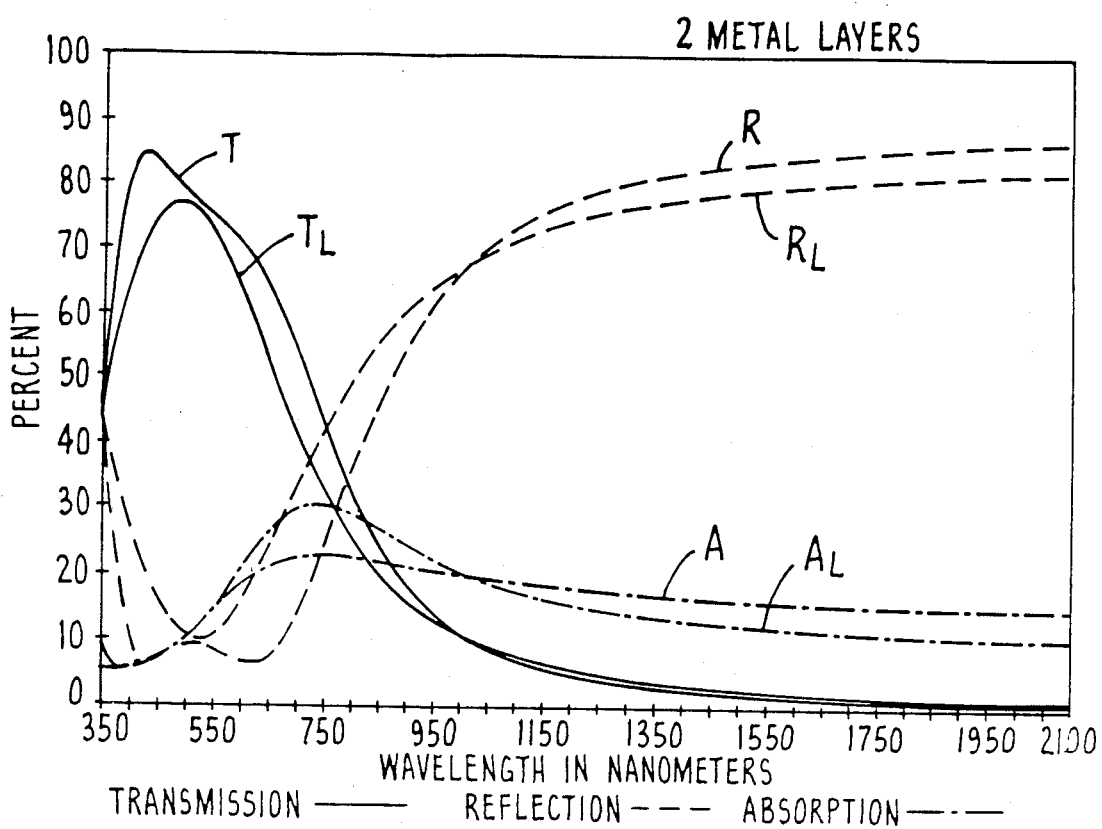
FIG. 8 is a graph illustrating the improved performance of a reflecting film of this invention having two transparent metal layers.

Turning to FIG. 8 comparable curves are presented for a filter of the invention having two metal layers. This filter uses the same materials and the same lamination layer used in the filter characterized in FIG. 7. The filter layers are 35 nm of dielectric, 10.7 nm of silver, 75 nm of dielectric, 10.7 nm of sputter-deposited silver and 40 nm of dielectric. The curves are identified as in FIG. 7. One advantage is clear from the curves. In the infrared region, this filter is much more efficient and does not change appreciably when laminated. When Tvis and Tsol and SC values are determined it is seen that the drop in Tvis is much less pronounced and in fact, relatively less or the same than the drop in Tsol. (Tvis went from 76% to 70%. Tsol went from 45% to 40%.) The SC value for the laminated material is a superior 0.53.

Figure 9:
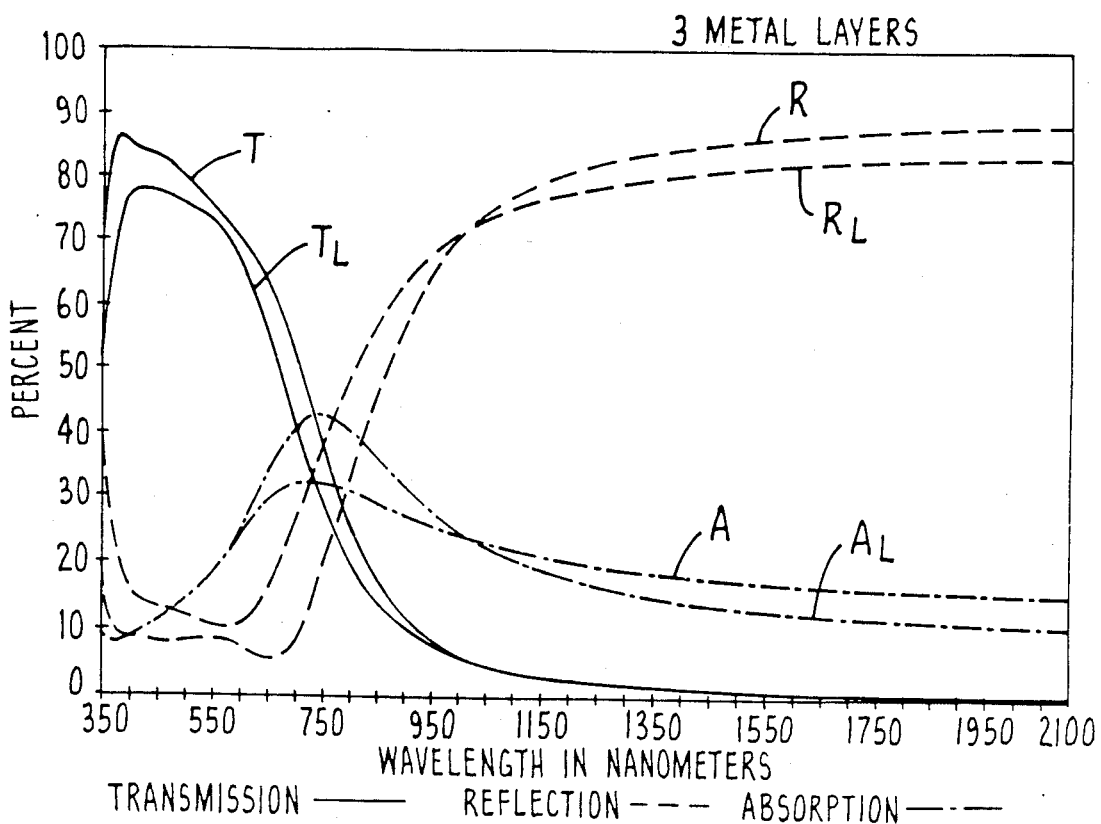
FIG. 9 is a graph illustrating the improved performance of a reflecting film of this invention having three transparent metal layers.

In FIG. 9 the same data are presented for a filter of this invention having three sputter-deposited transparent metal layers. This filter uses the same materials used in the filters characterized in FIGS. 7 and 8 in a 35 nm dielectric/7 nm silver/65 nm dielectric/10 nm silver/70 nm dielectric/9 nm silver/35 nm dielectric structure. With this filter, the drop in Tvis is relatively less than the drop in Tsol so that the efficiency of the filter was substantially unchanged by lamination. (Tvis went from 74% to 70%. Tsol went from 42% to 38%.)

Methods of Preparation

The films of this invention are prepared by laying down a series of uniform continuous layers of metal and dielectric in sequence on a support. The metal layers are laid down using magnetron sputtering. This technique can also be used to lay down the dielectric layers if they are of the inorganic oxide type which is preferred. Importantly, this technique can achieve the desired direct contiguous deposit of the various layers upon one another and upon the support layer without resort to nucleation layers and the like.

This technique and apparatus suitable for carrying out the production of the present materials are both described in detail in U.S. Pat. No. 4,204,942 of Charroudi (May 27, 1980) which for brevity is incorporated herein by reference.

Chemical coating or vapor deposition can be used to deposit the dielectric materials but are not preferred. If these methods are used, conventional techniques of thermal evaporation, electron beam evaporation and chemical vapor deposition and the like known to those of skill in the art will be employed.

Although this invention has been described with reference to certain preferred embodiments, these are not to be construed as limitations upon the invention's scope which is as defined by the following claims:

What is claimed is:

1. In a transparent, infrared reflecting composite film including a transparent metal layer-dielectric layer filter adhered to one side of a transparent support, the improvement comprising employing as the transparent metal layer-dielectric layer filter a visible light-transmitting infrared-reflecting Fabry-Perot interference filter which includes at least two separate discrete continuous sputter-deposited transparent metal layers separated from one another by a discrete continuous spacer layer of sputter-deposited inorganic metal oxide, compound or salt dielectric wherein each transparent metal layer is contiguous with and directly adherent to the adjacent spacer layer of dielectric without an intervening nucleation layer.

2. The improved composite film of claim 1 wherein the support is plastic.

3. The improved composite film of claim 2 additionally comprising a protective layer layer adhered to the side of the support which does not have the transparent metal layer-dielectric layer filter adhered thereto.

4. A transparent, infrared reflecting composite film comprising a transparent support having adhered to one surface thereof the first layer of a five layer interference filter each of the five layers comprising a continuous discrete sputter-deposited layer directly contiguous with its adjacent layers, the first, third and fifth layers being dielectric layers and the second and fourth layers being transparent metal layers.

5. A transparent, infrared reflecting composite film comprising a transparent support having adhered to one surface thereof the first layer of a seven layer interference filter each of the seven layers comprising a continuous discrete sputter-deposited layer directly contiguous with its adjacent layers, the first, third, fifth and seventh layers being dielectric layers and the second, fourth and sixth layers being transparent metal layers.

6. A visually transparent, infrared reflecting composite film comprising a transparent support having adhered to one surface thereof an interference filter comprising two or more continuous discrete sputter-deposited transparent metal layers each of which is directly sandwiched between continuous layers of dielectrics.

7. A process for preparing a transparent, infrared reflecting composite film including a transparent metal layer-dielectric layer Fabry-Perot interference filter adhered to a transparent support comprising the steps of
   a. directly sputter depositing upon the transparent support a discrete continuous first outer layer of dielectric,
   b. directly sputter depositing upon the first outer layer a discrete continuous first transparent metal layer,
   c. directly sputter depositing upon the first transparent metal layer a discrete continuous first spacer layer of dielectric,
   d. directly sputter depositing upon the first spacer layer a discrete continuous second transparent metal layer,
   e. directly sputter depositing upon the second transparent metal layer a discrete continuous second spacer layer of dielectric,
   f. directly sputter depositing upon the second spacer layer a discrete continuous third transparent metal layer, and
   g. directly sputter depositing upon the third metal layer a second outer layer of dielectric thereby forming a filter having three discrete metal layers.

8. A visually transparent, infrared reflecting composite film comprising a transparent support having adhered to one surface thereof an interference filter having a plurality of continuous directly contiguous stacked layers, said layers comprising:
   a. a dielectric layer,
   b. a discrete sputter-deposited transparent metal layer,
   c. one or more pairs of layers, each pair comprising a dielectric spacer layer and
   a discrete sputter-deposited transparent metal layer, and
   d. a dielectric outer layer.

9. The composite film of claim 8 wherein the metal layers each are from 4 to 40 nm in thickness and the dielectric layers each are from 40 to 200 nm in thickness.

10. The composite film of claim 9 wherein the metal layers each comprise metal selected from the group consisting of silver, gold, platinum, palladium, aluminum, copper and nickel and alloys thereof.

11. The composite film of claim 9 wherein the support comprises plastic.

12. The composite film of claim 9 wherein the support comprises glass.

13. The composite film of claim 8 wherein the dielectric is a sputter-deposited dielectric.

14. The composite film of claim 13 wherein the metal layers each comprise silver and each are from 4 to 17 nm in thickness and the dielectric layers each have an index of refraction of from about 1.75 to about 2.25 with the spacer layers having a thickness of from 70 to 100 nm and outer layers having a thickness of from about 30 nm to about 70 nm.

15. The composite film of claim 14 wherein there are two metal layers each from 10 to 12 nm in thickness.

16. The composite film of claim 14 wherein there are three metal layers each from 5 to 10 nm in thickness.

17. The composite film of claim 8 wherein said one or more pairs layers comprise a single pair.

18. The composite film of claim 8 wherein said one or more pairs of layers comprise two pairs.

19. A process for preparing a transparent, infrared reflecting composite film including a transparent metal layer-dielectric layer Fabry-Perot interference filter adhered to a transparent support, comprising the steps of
   (a) directly sputter-depositing upon the transparent support a discrete continuous first layer of dielectric,
   (b) directly sputter-depositing upon the first layer a discrete continuous first transparent metal layer,
   (c) directly sputter-depositing upon the first transparent metal layer a discrete continuous spacer layer of dielectric,
   (d) directly sputter-depositing upon the spacer layer a second discrete continuous transparent metal layer, and
   (e) directly sputter-depositing upon the second metal layer a second outer layer of dielectric.

20. The process of claim 19 wherein the metal is silver and wherein the transparent support is plastic.

21. A window glazing material product comprising a transparent glass support having directly adhered to one of its surfaces an interference filter comprising two or more continuous discrete sputter-deposited transparent metal layers each of which is directly sandwiched between continuous layers of dielectric.

22. The window glazing material of claim 21 additionally comprising a protection layer located over the interference filter.

23. A window glazing material product comprising a transparent glass sheet substrate having adhered to one side a transparent plastic sheet support, said support having on its side not adhered to the glass sheet substrate an interference filter comprising two or more discrete sputter-deposited transparent metal layers each of which directly sandwiched between continuous layers of dielectric.

24. A window glazing material product comprising a transparent plastic sheet support having adhered to one side an interference filter comprising two or more discrete sputter-deposited transparent metal layers each of which is directly sandwiched between continuous layers of dielectric, and a transparent glass sheet substrate adhered to said interference filter.

25. A window of glazing material product comprising a pair of sheets of plastic or glass, spaced from each other in parallel alignment to present an internal space between them; and a visually transparent, infrared reflecting composite film suspended in the internal space in parallel alignment with the glass or plastic sheets, said composite film comprising a transparent plastic sheet support having adhered to one side thereof an interference filter comprising two or more continuous discrete sputterdeposited transparent metal layers each of which is directly sandwiched between continuous layers of dielectric.

* * * * *